US006855907B2

(12) United States Patent
Bertuzzi et al.

(10) Patent No.: US 6,855,907 B2
(45) Date of Patent: Feb. 15, 2005

(54) METAL CUTTING PROCESS

(75) Inventors: Renato Bertuzzi, Hamilton (CA);
Gregory G. Rivers, Dundas (CA)

(73) Assignee: National Steel Car Limited (CA)

( * ) Notice: Subject to any disclaimer, the term of this patent is extended or adjusted under 35 U.S.C. 154(b) by 313 days.

(21) Appl. No.: 09/752,141

(22) Filed: Dec. 29, 2000

(65) Prior Publication Data

US 2002/0084259 A1 Jul. 4, 2002

(51) Int. Cl.[7] .............................................. B23K 9/00
(52) U.S. Cl. ........................... 219/121.39; 219/121.58; 219/121.44; 219/121.48
(58) Field of Search ..................... 219/121.39, 121.58, 219/121.44, 121.48, 121.4, 121.38, 121.41, 121.69, 121.72; 83/15–16, 170–171, 27, 406, 155, 157; 198/370.07, 689.1, 456, 415; 72/129; 266/44; 29/558; 144/364

(56) References Cited

U.S. PATENT DOCUMENTS

| | | | | |
|---|---|---|---|---|
| 3,866,892 A | * | 2/1975 | Hooper | 266/58 |
| 4,070,890 A | * | 1/1978 | Stubbings | 72/129 |
| 4,103,595 A | * | 8/1978 | Corse | 439/362 |
| 4,516,614 A | * | 5/1985 | Grimhall et al. | 144/364 |
| 4,633,055 A | * | 12/1986 | Conley | 219/121.36 |
| 5,787,559 A | * | 8/1998 | Dean | 29/33 R |
| 5,787,566 A | * | 8/1998 | Stursberg | 29/558 |
| 6,126,890 A | * | 10/2000 | Anderson | 266/44 |
| 6,222,155 B1 | * | 4/2001 | Blackmon et al. | 219/121.39 |
| 6,315,101 B1 | * | 11/2001 | Hugon | 198/370.07 |

* cited by examiner

*Primary Examiner*—Quang T. Van
(74) *Attorney, Agent, or Firm*—Hahn Loeser & Parks LLP; Michael H. Minns

(57) ABSTRACT

A metal cutting process employs an apparatus including a cutting machine operable to cut two dimensional profiles in plates. The plates are transported to and from the cutting machine on carriages. The carriages are movable between a cutting, or burn position, an un-loading position, and a loading, or re-loading position along a path. The path forms a closed circuit, or loop. In the burn position the cutting machine is operable to cut profiles in the plates. Cutting on one carriage can occur while another carriage, or other carriages, are being loaded or unloaded, or both. The carriages can be cycled along the path repeatedly. The apparatus can include a de-coiling machine for un-coiling coils of steel sheet, and the process can include uncoiling a steel sheet directly onto one of the carriages. The process can also include cutting a steel sheet in a single piece to form the side of a large structure, such as a rail road car.

21 Claims, 13 Drawing Sheets

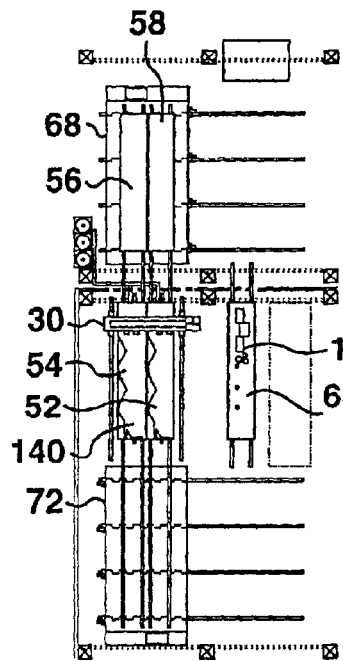
FIG. 3a
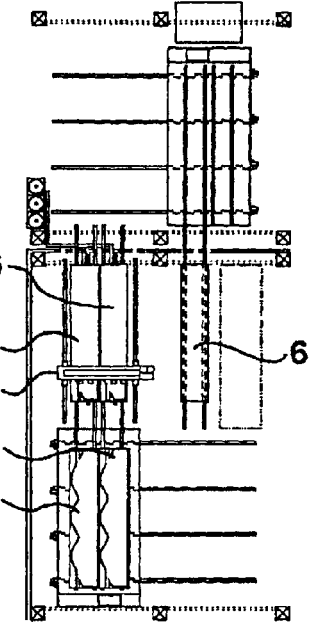
FIG. 3b
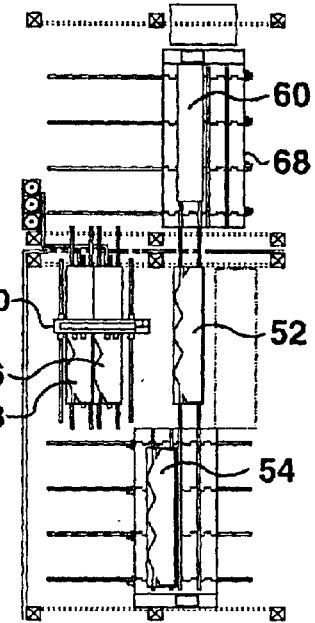
FIG. 3c
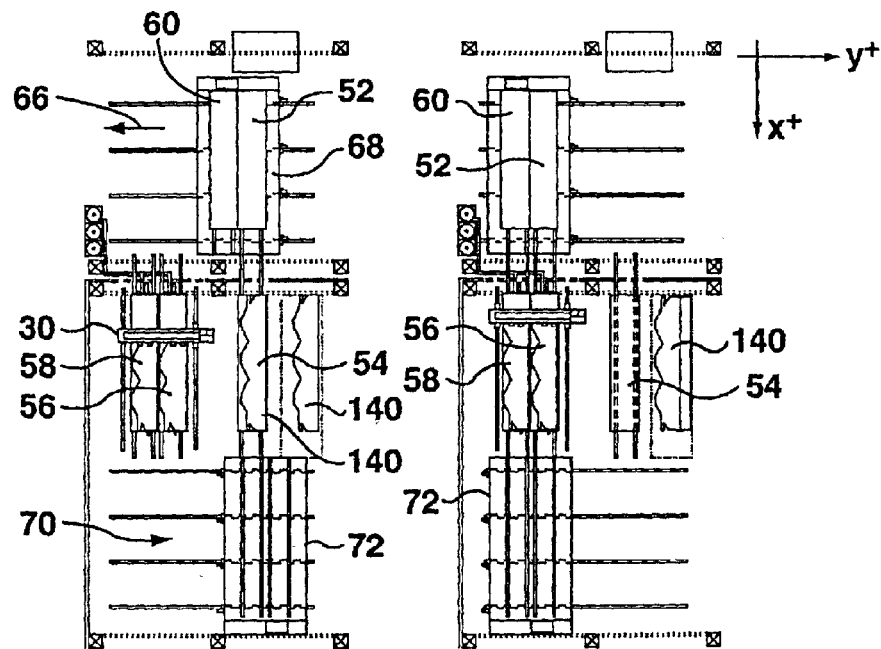
FIG. 3d     FIG. 3e

METAL CUTTING PROCESS

FIELD OF THE INVENTION

This invention relates to the cutting of metal sheets, such as for example, steel plates used in heavy metal fabrication.

BACKGROUND OF THE INVENTION

In heavy metal fabrication industries, it is often required to cut large sheets of metal, typically steel, to a given profile according to a particular design. These sheets may be too large and too heavy for convenient manipulation by hand. In the past, complex patterns were scribed, drawn in chalk or painted on the metal sheet to be cut. Personnel would then, typically, use torches to cut the desired profile as laid out. This system had a number of disadvantages, most notably the reliance on human skill both for transferring the design to the metal sheet, and in making the cut.

More recently, metal plates have been mounted on supports and moved beneath a bridge or gantry having a movable cutting head. The combination of being able to move the bridge on rolling supports in one direction, while being able to move the cutting head across the span of the bridge in a perpendicular direction permitted a profile of arbitrary planar shapes to be cut as desired. The addition of programmable control increased both the accuracy and productivity of the cutting process, and the use of a plasma arc cutting head permits the cuts to be made with higher accuracy than with a flame cutting torch.

In particular, plasma arc cutting has been used with the work piece to be cut supported on a submerged bed located in a bath. The bath is thought to absorb or reduce the noxious fumes produced in the cutting process. When the cut is finished, the liquid level in the bath is reduced to expose the parts, the cut parts are removed, and new materials are added.

However, while there may have been a significant investment in the cutting machinery, and in the controls used to operate the cutting machinery, the portion of the duty cycle spent in the cutting operation remained relatively low. For example, in the first step the supporting frame would be loaded with large sheets to be cut. This loading process generally involved using cranes to lift new sheets from a stock of sheets, carrying the sheets overhead, and carefully placing the new sheets to be cut in position.

Once the sheets were in position, the level of liquid in the bath was raised again to submerge the material. The cutting apparatus could then cut the sheet into the desired pieces. When finished, the cutting head would be moved to one side to give access to the various pieces. The shop personnel would then transport the cut pieces to the next production stage (or inventory, as might be), and remove the scrap. Removal of cut pieces did not tend to occur while other cutting was underway, since it might not have been prudent for personnel accidentally to provide an unintentional path to ground for the plasma arc, loading generally requires the lowering of the liquid level in the bath, and a mistake in moving material could result in shifting the remaining pieces to be cut, thus possibly yielding an incorrect profile. For these reasons it was generally only practical to remove pieces after cutting was complete.

Unloading commenced with the lowering of the level of the bath. Once all of the useful pieces and scrap had been moved away, the new stock could be brought in, and the table re-loaded. Typically, the removal of cut pieces and scrap impeded the placement of new sheets on the cutting frame such that removal had to be complete before the laying of new sheets for cutting could begin. Once loaded with new material, the level of the bath would be raised again to immerse the new sheets. All the while, during loading of new stock and unloading of cut pieces and scrap, the cutting machinery tended to be idle. By one estimate, the length of time spent loading and unloading significantly exceeded the actual time spent cutting. Although it was possible to improve production by operating two baths end-to-end, sharing a cutting head, the overall level of productivity was not necessarily entirely satisfactory. It would be advantageous to cut material more nearly continuously, and to permit at least some of the unloading of cut parts to occur in a different location, from the loading of new sheets of metal.

The baths had another disadvantage related to operation in cooler climates. Although sheltered from wind and snow, the shop was typically not heated. If the bath were left inoperative for a significant length of time, such as during Christmas shut-down, either a heating element was required to keep the bath above freezing, or anti-freeze was required, or both. Antifreeze would have to be drained, and the bath flushed before recommencing operation. If the bath were allowed to freeze, the time and effort required to put the system back in operation was significant.

In still more recent times, plasma arc systems have been operated without using the submerged bath apparatus. Rather than using a liquid medium to absorb undesirable gases, a vacuum system is used to draw off the gases. Not using a bath system provides the opportunity to unload and reload the work material not piece-by-piece, while the cutting heads sit idle, but rather by changing out the entire bed. That is, by having several beds, and moving them relatively quickly, the entire cutting facility can be re-loaded in a few minutes, and then loading and unloading can take place elsewhere while the material in the next bed is cut. When a non-liquid bath system is used, it is possible to move an entire bed more easily, without concerns about managing the liquid in the bath. The beds can be moved either by lifting, as with overhead gantry cranes, or by movement along a track work, such as might be laid on the floor of a bay.

In the former process, parts were removed piece-by-piece, using electromagnetic clamps to lift the cut pieces of steel. (in the case of non-magnetic materials magnetic lifting is not appropriate, in which case other lifting techniques, such as suction systems can be used in some instances). It would be advantageous to lift all the pieces off the bed at once, or in a relatively small number (two or three) of lifts, then to carry them away with an overhead crane, or to lay then on pallets where other equipment, such as forklifts and tractors, can sort and transport the cut parts as need be. It is similarly advantageous to be able to re-load the beds in a position away from the cutting head, or heads. By doing this, a vacant bed can more quickly be made ready for another cutting operation.

Use of a bath to submerge the material to be cut tended also to impose practical limitations on the size of pieces that could be cut. Part size was limited by the bath size. When a particularly large panel was desired a number of individual plates would have to be cut, aligned, and butt-welded together. For example, a number of different types of rail road cars employ side walls that are of the order of 60 ft in length, and up to about 11 feet in width from side sill to top chord. An example of such a car is a grain car or a plastic pellet car. These sidewalls have generally been fabricated by joining a plurality of plates together. It would be advantageous to be able to accept sheet from the rolling mill in a sufficient length and width to be able to cut these side walls from a single sheet, thereby eliminating the fabrication involved in butt-welding a number of plates together. Such a method of fabrication would tend to reduce defects in the resultant car structure, would tend to reduce tolerance build-up in the overall assembly, and generally facilitate assembly of the cars.

At present, long steel sheet, such as would be required to make a single piece side sheet of 60 ft length is available in coils from the rolling mill. To process the sheet directly, the coils require uncoiling. Consequently, it would be advantageous to provide a de-coiling facility adjacent to the cutting facility. It would also be advantageous to be able to load the uncoiled sheet directly into a cutting bed, and then move the bed into position for cutting.

SUMMARY OF THE INVENTION

The invention relates to an apparatus for cutting sheet metal, in which there is a cutting head that is operable to cut profiles in two dimensions, such as an x-y plane in generally planar work pieces, such as metal sheet or plate. The apparatus also includes movable carriages, or beds, on which the work piece material is loaded. The beds are movable such that once a bed is loaded, it can be relatively quickly moved into a cutting position under the cutting tool, by which it can be cut. Once cutting is complete, the first movable bed can be moved away relatively quickly, and another movable bed can take its place in the cutting position, whereby the productivity of the cutting process may tend to be enhanced by keeping the cutting head busy while the first, and other, carriages are being unloaded and loaded (or re-loaded).

In one aspect of the invention there is an apparatus for the cutting of sheets of metal material. The apparatus has a first transfer carriage for supporting material to be cut, a cutting head, and a pathway along which to move the transfer carriage. The cutting head and the transfer carriage are movable relative to each other to permit the cutting head to cut profiles of objects lying in a plane. The carriage is movable between a loading position clear of the cutting head, and a cutting position in which the carriage presents the material to be cut to the cutting head. The pathway has a portion along which the carriage can by-pass the cutting head.

In a feature of that aspect of the invention, motion of the cutting head relative to the transfer carriage is automatically controlled. In another feature of that aspect of the invention, the cutting head includes a cutting member chosen from the set of cutting members consisting of (a) a cutting torch; and (b) a plasma arc. In an additional feature, the apparatus further includes a venting system operable to convey fumes from operation of the cutting member away from said apparatus. In another feature, the venting system is a vacuum system operable to draw fumes from below the cutting head.

In another feature, at least the cutting head and a portion of the path adjacent to the cutting head are mounted within a sheltering structure. In still another feature, at least a portion of the path is over-spanned by a movable crane, the crane being operable to engage pieces of the sheet material. In a further feature, the path has the form of a continuous circuit. In an additional further feature, the path includes alternate branches by which more than one carriage can be conducted to a position for interaction with the cutting head.

In a still further feature, the apparatus has more than one cutting head operable to cut profiles in material transported by the carriage.

In yet another feature, the path includes alternate branches, the apparatus includes more than one carriage and more than one cutting head, and the carriages can be directed to the alternate branches for engagement by more than one cutting head at a time. In still another feature, the carriage is a first carriage, and the apparatus includes at least a second carriage, and the first carriage is movable to the loading position while the second carriage is in the cutting position. In still another feature, the carriage is a first carriage, the apparatus includes at least a second carriage, and the path includes an unloading position clear of the cutting position.

In a further feature, the first carriage is movable to the unloading position while the second carriage is in the cutting position. In still another feature, the unloading position is mounted within a sheltering structure. In again another feature, the first carriage is movable between the unloading and loading positions while the first carriage is in the cutting position. In another feature, the apparatus includes a first drive train operable to move the carriage along a first axis relative to the cutting head in the cutting position. In another feature, the apparatus includes a second drive train operable to return the carriage to the loading position.

In another aspect of the invention there is a process for the manufacture of rail road car side sheets including the steps of: placing a steel sheet having a length at least half as great as the length of the rail road car on a carriage; passing the carriage to a cutting position; and employing a cutting tool to cut a portion of the profile of the rail road car in the sheet.

In an additional feature of that aspect of the invention, the step of placing is preceded by the step of de-coiling at least a portion of a coil of steel sheet, and the step of placing includes placing the sheet so uncoiled on the carriage.

In a further aspect of the invention, there is a plasma arc cutting process for cutting steel sheet the process comprising the steps of: placing a sheet of steel to be cut on a movable carriage; moving the carriage to a cutting position; operating a plasma arc cutting tool to cut a part profile in the sheet; and moving the carriage away from the cutting tool.

In another feature of that aspect of the invention, the step of moving the carriage away from the cutting tool is followed by the step of moving another carriage into the cutting position, and cutting material placed on that other carriage. In another feature the step of moving the carriage away from the cutting position is followed by the step of unloading the carriage while another carriage is being cut by the cutting tool. In anther feature the step of unloading the carriage occurs while a third carriage is being prepared for movement to the cutting position. In still another feature, the process includes repetitively moving the carriages through a cycle of steps of loading, cutting, and unloading. In still another feature, the process includes moving the carriages along a circuit, the circuit including at least the cutting position and a loading position.

In still another aspect of the invention, there is a plasma arc cutting apparatus including: a plasma arc cutting head, the head being mounted to move in two directions to permits the cutting head to cut profiles in a stationary planar workpiece; and a movable bed for supporting a planar workpiece. The movable bed is movable to a cutting position in which the cutting head is operable to cut the work piece, and the movable bed is operable to transport the workpiece away from the cutting head when cutting of the workpiece has ceased.

In another feature of that aspect of the invention, the apparatus includes a plurality of movable beds, a first of the movable beds being movable to occupy the cutting position after a second of the movable beds has been moved away from the cutting position. In still another feature of that aspect of the invention, the movable beds are constrained to move in a circuit between the cutting position and a loading position.

BRIEF DESCRIPTION OF THE DRAWINGS

FIG. 3a shows a smaller version of FIG. 1 illustrating a stage in the cyclic procedure for cutting metal sheets;

FIG. 3b shows a stage following the stage of FIG. 3a;

FIG. 3c shows a stage following the stage of FIG. 3b;

FIG. 3d shows a stage following the stage of FIG. 3c;

FIG. 3e shows a stage following the stage of FIG. 3d, returning to a state similar to that of FIG. 3a;

FIG. 5b shows upper and lower wear lows as employed in the carriages of FIG. 5a;

FIG. 6b shows a detail of a motor installation of a secondary carriage of FIG. 6a;

FIG. 7c shows a detail of a carriage pulling and pushing towing head of the secondary carriage of FIG. 6a;

FIG. 8b shows a detail of a control assembly for the exhaust manifold of FIG. 8a.

DETAILED DESCRIPTION OF THE INVENTION

Figure 1:
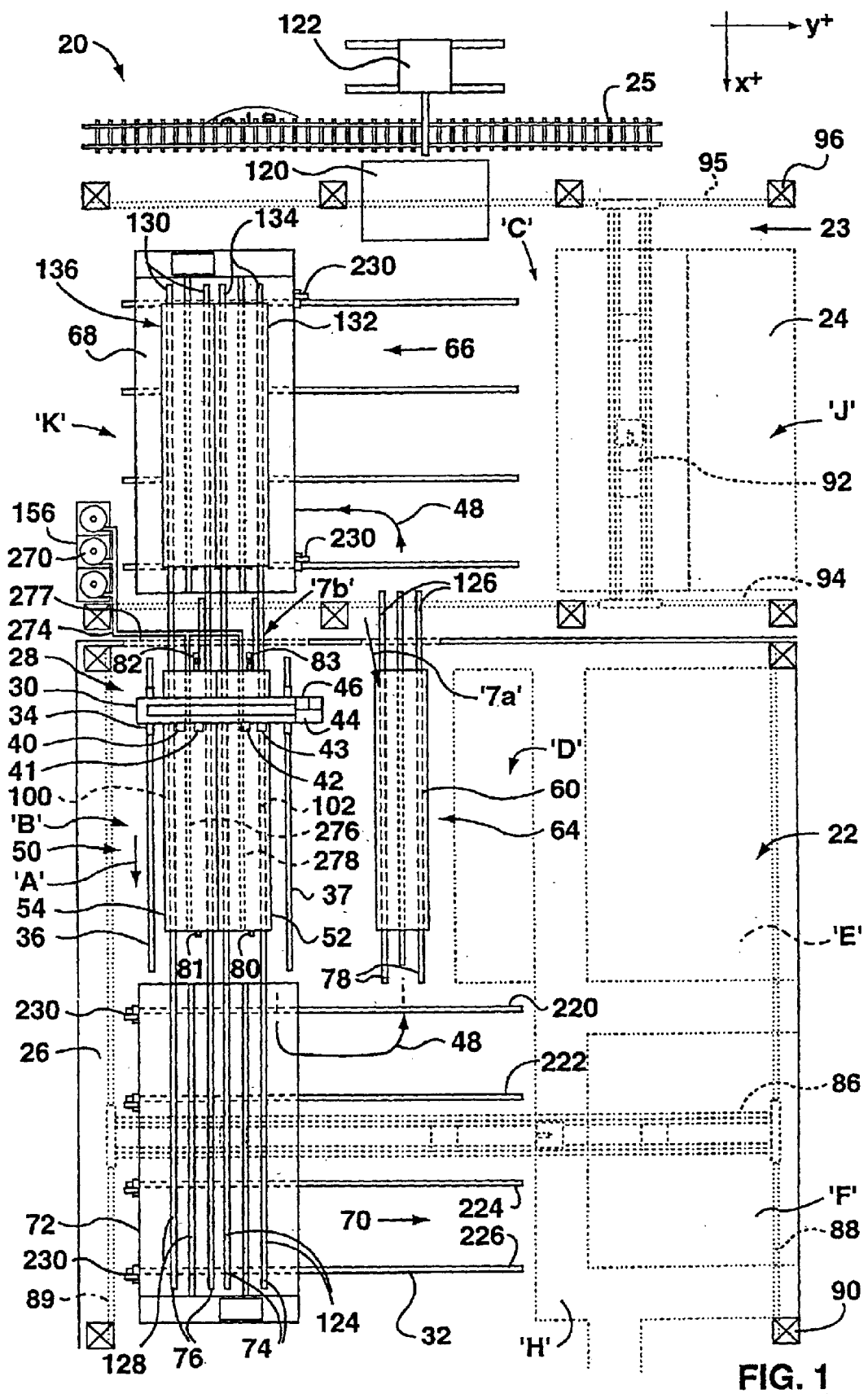
FIG. 1 shows a schematic plan view of a factory having a plate cutting facility according to the principles of the present invention.

The description which follows, and the embodiments described therein, are provided by way of illustration of an example, or examples of particular embodiments of the principles of the present invention. These examples are provided for the purposes of explanation, and not of limitation, of those principles and of the invention. In the description that follows, like parts are marked throughout the specification and the drawings with the same respective reference numerals.

In terms of general orientation and direction nomenclature, reference is made below to advance and return, and to transverse motion. For the purposes of this description the cutting process pertains to cutting a generally horizontally planar sheet or plate with a vertically oriented cutting tool. Relative motion between the cutting tool and the sheet or plate is two-dimensional motion that can be described in terms of components lying along two axes in a horizontal plane. For the purposes of this description those axes will arbitrarily be given the nomenclature of x and y axes, the x, or longitudinal, axis lying in the direction of advance or return of the sheet or plate, and the y, or transverse, axis lying perpendicular to the x axis.

In FIG. 1, a manufacturing facility is indicated generally as 20. It includes a sheltering structure in the nature of a factory building or shop 22 that has a yard 24 having an accessway, such as a road 23 or rail siding 25 by which raw stock materials can enter the plant and finished products may be shipped to market. Shop 22 includes a bay 26 in which a metal cutting apparatus in the nature of a multi-head plasma-arc cutting facility 28 is located.

Cutting facility 28 includes a longitudinally moveable spanning member, termed a burn carriage, or bridge 30 located to straddle a pathway, or track, of a material transport apparatus or, transfer system 32, described more fully below. Bridge 30 is mounted on wheels 34 at either end, wheels 34 being mounted on a pair of parallel ways 36, 37 to permit travel in the x direction. Bridge 30 has an electric geared drive 38 that is operable in cooperation with toothed racks adjacent to ways 36, 37 to move bridge 30 longitudinally with a level of precision appropriate for cutting a profile in the work-piece material. Cutting facility 28 includes four plasma-arc cutting heads 40, 41, 42 and 43, all mounted to bridge 30, and each being operable to move along the span (that is, in the y-direction) of the bridge 30 to permit cutting of each objects located beneath bridge 30 as required. In addition to x-y motion the cutting heads can also be tilted to produce a bevelled, or chamfered edge. Cutting facility 28 is controlled numerically by a computer 46 mounted beside the operator console 44 the cutting heads 40 to 43 being employed to cut profiles in sheets of material according to design information fed into a computer 46.

Transfer system 32, follows a path, indicated generally as 48, in the form of a rectangular continuous loop, or circuit. Path 48 has a first portion 50 running in the longitudinal, or x direction. Moving frames, or carriages, indicated as items 52, 54, 56, 58, and 60 are provided to transport sheets of material to be cut in an advancing direction, as generally indicated by arrow 'A' (parallel to the x-axis). The carriages convey the sheets or plates to a cutting range, or cutting zone (namely the burn position indicated generally by arrow 'B'), where the sheets are cut according to chosen design profiles input to computer 46. Transfer system 32 includes a second, or return, portion 64 by which carriages from the output side of cutting facility 28 can bypass cutting heads 40 to 43 and be returned back to the input side of cutting facility 28.

Transfer system 32, in addition to advance portion 50, and return portion 64, includes a first, or input, lateral transfer portion 66 by which carriages can be moved on secondary carriages in the nature of a lateral transfer cart, or shuttle 68, that is movable along transverse portion 66 in the transverse, or y direction on a between return portion 64 and advance portion 50 on the input side of cutting facility 28. Transfer system 32 also includes a second, or output, lateral transfer portion 70, also running in the y-direction, across which the carriages can be moved on another secondary carriages in the nature of a second lateral transfer cart, or shuttle 72, that is movable along transverse portions 70 in the transverse, or y direction, between advance portion 50 and return portion 64 on the output side of cutting facility 28.

Transfer shuttles 68 and 72 are wider in the x direction than carriages 52, 54, 56, 58, and 60 are long, and have first and second ways 74, 76 spaced to match the ways upon which those carriages travel in advance portion 50 and return portion 64. When shuttle 68, or 72, is aligned with advance portion 50, a carriage, such as carriage 52 or 54, can be advanced from portion 50 and onto ways 74, 76 of shuttle 72. When carriage 52 is thus positioned, shuttle 72 can be moved transversely (in the +y-direction, until aligned with the ways 78 of return portion 64. When aligned, carriage 52 or 54 can be urged backwards, that is, in the return or −x direction, out of shuttle 72. In the illustrations of FIGS. 1, 2 and 3a to 3e the size of carriages 68 (and 72) is exaggerated relative to carriages 52–60 for the purposes of clarity of conceptual explanation.

In the embodiment illustrated in FIG. 1, transfer system 32 includes a loading zone (indicated generally by arrow 'C') adjacent to the return portion 64 lying generally to the input side of cutting zone 'B'. Similarly transfer system 32 has an unloading zone, indicated generally by arrow 'D', adjacent to return portion 64. In the general course of operation, the carriages are loaded with new stock at loading zone 'C', moved across input transfer portion 66 on shuttle 68, and advanced along portion 50 in the direction of arrow 'A' to a cutting position in cutting zone 'B'.

When in the cutting position, also called the "burn position", the particular carriage is, or carriages are, temporarily locked in position against stops mounted in a fixed, known reference position. The first stops 80, 81 have the form of retractable electrically grounded posts having an electrically conductive platen facing whichever of the carriages is located in the adjacent burn position. Stops 80, 81 can be lowered when it is desired to move carriages with cut materials out of the burn position. At the far end of the carriages, retractable clamping members 82 and 83 are raised to bear against the opposite end of the respective carriages, (such as 52, 54) and tightened, thus squeezing the carriages between themselves and stops 80 and 81 respectively, and fixing them in a known datum location relative to bridge 30. Clamping members 80 and 81 also employ electrically conductive, and electrically grounded platens such that the clamping process also serves to provide an electrical path from the carriage through which the plasma arc current can find ground either through stops 80, 81 or through clamping members 82, 83 or both. Once the carriage is, or carriages are, locked in position, bridge 30 and cutting heads 40–43 are moved co-operatively in the x and y directions to produce the desired profiles.

After the various items have been cut, the carriages are (or carriage is) unlocked by releasing clamping members 82, 83, and lowering stops 80, 81. The carriages can then continue along advancing portion 50 and onto output lateral transfer shuttle 72 until in position to be transferred laterally to return portion 64. Once advanced, or, alternatively at the same time as they are being advanced, another carriage (or pair of carriages) such as carriages 56 and 58 can be advanced into the burn position for cutting. While the next set of plates is being cut, the first carriage is moved to the unloading position in unloading zone 'D'. Once the cut parts are unloaded, the carriages, bearing only the scrap, are returned to loading zone 'C' along return portion 64 where the scrap is removed and new material loaded. The various carriages can continue around the circuit in a continuous loop as long as there is material to be cut.

For the purposes of loading and unloading, manufacturing facility 20 is provided with an inside overhead crane, 86 mounted to run along rails 86, 89 mounted to building columns 90 inside shop 22. Crane 86 is moveable to overspan unloading area 'D' and adjacent work areas 'E' and 'F'. Alternatively, internal roadways G and H provide access by forklift such that materials in the unloading bay can be despatched to other areas of the plant. Manufacturing facility 20 is also provided with an external overhead crane 92 running in the y direction along rails 94, 95 mounted to pillars 96. Crane 92 is movable over a range covering loading area 'C', inventory area 'J' and first transfer shuttle 68. This arrangement permits loading of carriages mounted in first transfer shuttle 68 either when in a position most closely adjacent to inventory area 'J' or when moved further away, as for example, when aligned with first portion 50 and awaiting advancement in the x-direction to the burn position.

This arrangement may tend to permit operation of the cutting heads to continue while finished pieces are being unloaded and new stock is being loaded, thereby tending to improve utilization of the cutting heads. It also permits unloading of finished pieces from one carriage to occur while new stock is being loaded on another carriage.

In the embodiment shown in FIG. 1, first portion 50 of transfer system 32 includes first and second parallel branches 100 and 102, such that loaded carriages can advance along either branch, as selected, and, advantageously, two carriages can be in the cutting zone at one time such that cutting heads 40–43 can operate on more than one work piece at a time. The infeed area, indicated generally as K on the input side of cutting facility 22 is sufficiently large to accommodate a pair of waiting carriages side-by-side while another pair of carriages is in the cutting zone. In general, it is intended that two carriages be un-loaded and re-loaded one after the other while two other carriages are in the cutting zone being cut side-by-side.

It is not necessary that two carriages be cut at the same time, and it is not necessary that carriages always be in all of the cutting, loading, and unloading stations at the same time. While the five carriage arrangement illustrated in FIG. 1 is preferred for a circuit having a single track return portion, such as portion 64 the system can be operated with fewer carriages, or more, according to the space available. It may be that one carriage is loaded with material to be cut into a large number of small pieces, implying a relatively long cutting time, while another carriage has only a single large piece, or a few large pieces. In that case the double branch arrangement permits the faster cut carriage to be changed out, and another carriage put in its place, while the slower carriage remains in the burn position. Alternatively, operations can be carried out with a single carriage, but would generally be more effective if at least first and second carriages were used.

It is not necessary that the transfer system include a pair of branches in the cutting zone. It could include a single unique path, or more than two paths according to the number of cutting heads available. Similarly, there need not be a single, unique return portion, but rather, as in FIG. 2, a system 110 could be provided having a double track return portion 112. In the case of the embodiment of FIG. 2, it would be advantageous to use six carriages 52, 54, 56, 58, 60 and 114, given the ability to unload two carriages side-by-side.

It is not necessary that transfer system 32 be formed in a rectangular shape, with four separate drives each operable to urge the carriages along one side of the rectangle. For example, a triangle or other polygon shape, or an oval with large turn radii could be used. However, the rectangular arrangement is preferred since it does not require additional space for turn radii, does not require curved track to be laid, and does not require the carriages to be turned during operation. Rather, as described, the rotational orientation of the carriages in the horizontal plane remains constant throughout the processing operation.

Figure 2:
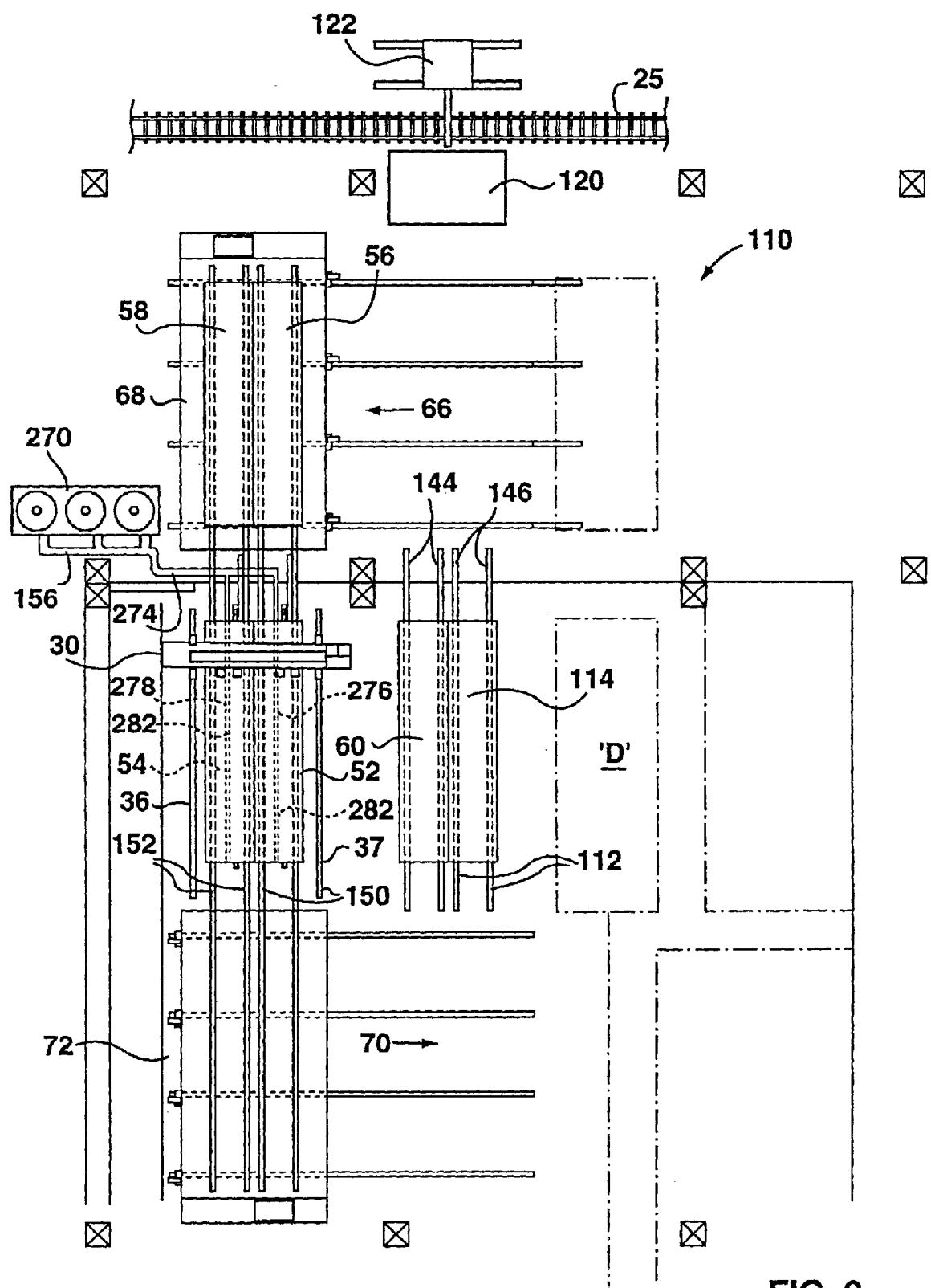
FIG. 2 shows a schematic plan view of an alternate of the factory of FIG. 1.
Figure 4:
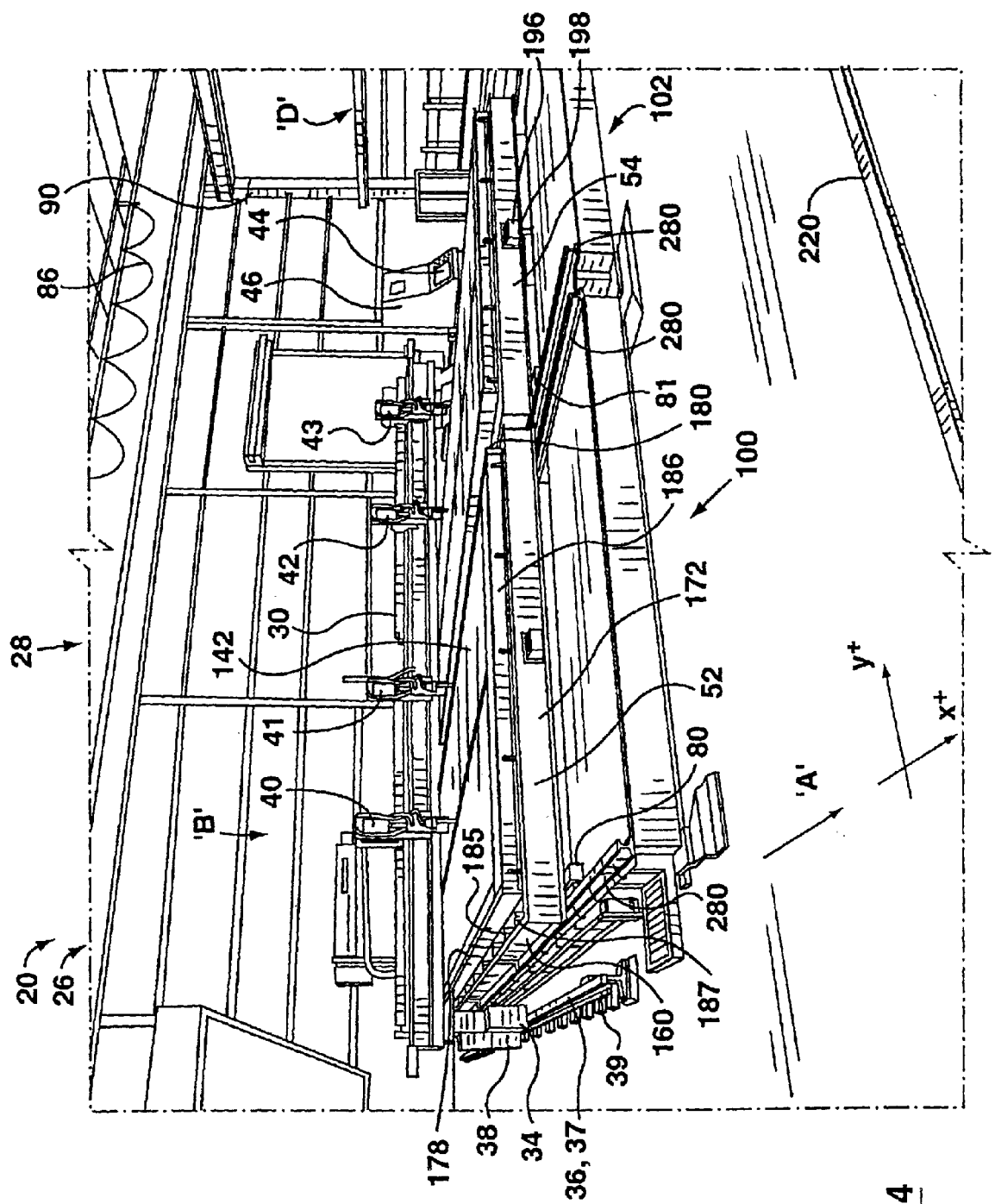
FIG. 4 shows in perspective view of the plate cutting facility of FIG. 1.

The sheet material to be cut by the apparatus of FIG. 1 or FIG. 2 is most typically steel sheet or steel plate that is substantially planar. That is, it is material of some thickness for which the cutting heads will trace out a profile defined in terms of a two dimensional plot defined by relative motion of the cutting heads and the work piece, (or pieces) along of x and y axes, where the x axis lies in the direction of advance along the ways of the first portion of track system 28, (and, parallel to the line of motion of return portion 64), and the y axis is the span direction of the bridge of cutting facility 28 along which cutting heads 40 to 43 run.

The steel sheets, or plates that can be transported on the carriages can be of significant size, according to the width and length of the carriage. In the preferred embodiment the carriage width permits plates up to 11 ft.-4 in. wide and 64 ft.-10 in. long and up to about 2 inches thick to be cut. That is, the carriage size significantly exceeds a 30 foot or 40 foot length, giving greater versatility in the size of parts that can be cut. Plates of this size are generally well beyond a size that might otherwise be manipulated by hand. Larger tables can be made to permit the cutting of larger plates. In an additional, optional feature, as shown in FIG. 1 and FIG. 2, a de-coiler 120 is provided between loading area 'C' and an adjacent rail siding 25. Crane 122 is located in a position to lift coils from rail road cars running on siding 25 into de-coiler 120. In operation the output from de-coiler 120 is fed directly onto a waiting carriage, such as carriage 56 mounted on shuttle 68. Shuttle 68 is then moved to a position to allow another un-coiled sheet or other material from stock to be loaded on an adjacent carriage, such as carriage 58 and transferred to a position to be moved to the burn position.

Operation of the Embodiment of FIG. 1

The sequence of operation of the cutting and transporting apparatus of FIG. 1 is shown in FIGS. 3*a* to 3*e*. To commence, as shown in FIG. 3*a*, carriages 52 and 54 are in the first and second slots in the burn position, respectively. Carriages 54 and 56 are in the corresponding first and second positions of first shuttle 100, and carriage 60 is in the unloading position on return portion 64. When the cutting of the pieces is finished on carriages 52 and 54, they are advanced onto the output transverse shuttle 72, and carriages 56 and 58 are advanced into the burn position, as shown in FIG. 3*b*. Cutting commences on carriages 56 and 58. Shuttle 72 is moved in the +y direction to align rails 124 with the rails 126 of return portion 64. Unloading of carriage 60 is either complete, or being completed.

As shown in FIG. 3*c*, shuttle 72 is moved further in the y direction to a position in which its second slot, or second pair of rails, 128 is aligned with rails 126 of return portion 54. Carriage 60, now unloaded, is moved onto rails 130 the second slot, or both of shuttle 68, and, once any remaining scrap has been removed (typically, to be recycled), loading commences either from stock or from de-coiler 120, with the aid of overhead gantry crane 92 as may be required. Shuttle 72 can be moved in the +y direction to align the rails 124 of its second carriage slot or both 132 with the rails 126 of return portion 64 either before, during, or after carriage 60 has been moved to shuttle 68, although it is preferable for both tasks to be performed simultaneously such that rails 126 of portion 64 are clear when carriage 52 lines up with them. In that case there need be little or no delay in moving carriage 52 from shuttle 72 to rails 126. While unloading commences from carriage 52, cutting continues on carriages 56 and 58.

As shown in FIG. 3*d*, carriage 60 has been moved with shuttle 68 in the −y direction to align the first set of rails 134 of shuttle 68 with the rails of return portion 64, and carriage 52, now unloaded, has been moved in the −x direction into the awaiting first, carriage slot, or berth of shuttle 68. Unloading of any remaining scrap is completed, and then loading of new material commenced, either from the stock of plates, or from coils passed through de-coiler 120. Shuttle 72 has been moved in the +y direction to align its second slot, or berth 138, with rails 126 of return portion 64, and carriage 54 is moved in the −x direction onto rails 126 of portion 64 for unloading. As above, the alignment of the second slot can take place before, during, or after movement of carriage 52 onto shuttle 126, but is preferably complete soon enough to permit carriage 54 to be moved as soon as rails 126 are no longer occupied by carriage 52. Unloading in zone 'C' commences. Cutting continues on carriages 56 and 68.

In FIG. 3*e*, the situation is similar to that of FIG. 3*a*. Cutting on carriages 56 and 58 is nearly complete. Shuttle 72 has been moved in the −y direction to position its slots, or berths, in a position to await loading of two carriages transporting freshly cut material, namely carriages 56 and 58. Shuttle 68 has been moved in the −y direction to align its rails with those of branches 70 and 72 of portion 50. As in FIG. 3*a*, a further two loaded carriages, namely carriages 60 and 52, are positioned in the slots, or berths, of shuttle 68, awaiting their turn to advance to the burn position as soon as the slots of the burn position are vacated by carriages 56 and 58. Carriage 54 is in the process of being unloaded.

In the example illustrated, the cut parts, 140, have the profiles of grain hopper car side sheets, cut in one piece. In the more general case, as also indicated by the several items 142 in FIG. 3*a*, this cut profile of parts 145 is intended to represent the cutting of profiles of a number of parts, from one large part to several parts of smaller size, whether being a batch of parts of one type, or a mixture of parts of different sizes.

Operation of the Embodiment of FIG. 2

The embodiment of FIG. 2, as noted above, differs from that of FIG. 1 in having a pair of side by side return portion rails 144 and 146. In this instance shuttles 68 and 72 do not have to shuffle between positions for transferring carriages in sequence either to or from a single track, such as rails 126 of portion 64. Rather, carriages 68 and 72 move to a single load/unload position, and both carriages can be, and preferably are loaded and unloaded at one time, side-by-side.

That is, while two carriages 52, 54 are in the burn position, another pair of carriages 60, 114 is moved on shuttle 72 to a position for being transferred in the −x direction onto the return rails 144, 146 of double branch return position 148, 72. When this action is complete, shuttle will reverse and take up its former waiting position opposite the ends of rails 150, 152 of the burn position. At the same time the third pair of carriages 56, 58 is being prepared (i.e., emptied of scrap, re-loaded with new material, and transferred into an aligned position) on the other shuttle. These activities could be performed in sequence, rather than simultaneously, but simultaneous preparation, loading and unloading may tend to improve overall productivity.

The system of FIG. 2 retains the capability to load one car at a time in series (rather than parallel), or to use only one input or output track, either to transfer carriages between sides of the loop or to reflect different cutting speeds according to the cuts required per carriage. However, in general the two carriage, side-by-side mode is considered advantageous for higher overall productivity for the embodiment of FIG. 2. The arrangement of FIG. 2 may tend to require greater floor space than that of FIG. 1.

Description of Carriages

In the embodiments of FIGS. 1 and 2, carriages 52, 54, 56, 58 and 60 (and 114) are rolling frameworks positioned to support the sheets, or plates, to be cut some distance above the floor of the bay. Carriages 52, 54, 56, 58, 60, and 114 are all of the same construction. They each have a pair of first and second longitudinally extending left and right hand side frames 160 and 162. Each side frame 160, 162 has a pair of back-to-back, spaced apart channels 164, 166. The channels are maintained in spaced apart parallel relationship by intermittently spaced gusset plates 185, 187. Flanged fore and aft wheels 188, 190 are mounted between channels 184, 186 in a position in which their motion is constrained to follow, that is, is guided by the rails running in the x direction. The gauge, or track spacing, of the rails of first portion 50, second portion 64, and the rails of the carriage berths of shuttles 68 and 72 are all the same, and the spacing of side frames 160, 162 is such as to yield the same spacing for wheels 168 and 170. Inclined slag deflector skirt plates 189 are mounted on the inboard face of inboard channel 186 to discourage accumulation of slag on the rails, and to encourage the slag to collect in the slag pans 300.

Each of the carriages also includes fore and aft, horizontally extending end frame members, 172, 174 welded across the ends of longitudinal side frames 160, 162. End frame members 172, 174 are formed from sections of channel, and co-operate with side frames 160, 162 to define the basic rectangular form of the carriages. The top flange of side frames 160, 162 and the top flange of end frames 172, 174 all lie in a common plane. A series of mounting brackets 176 are spaced along the upper flange of the inner channel member of each of side frames 160 and 162, and a pair of cap angles 178, 180 are bolted to brackets 176, with one toe extending downward, and the other toe extending inward.

Figure 5A:
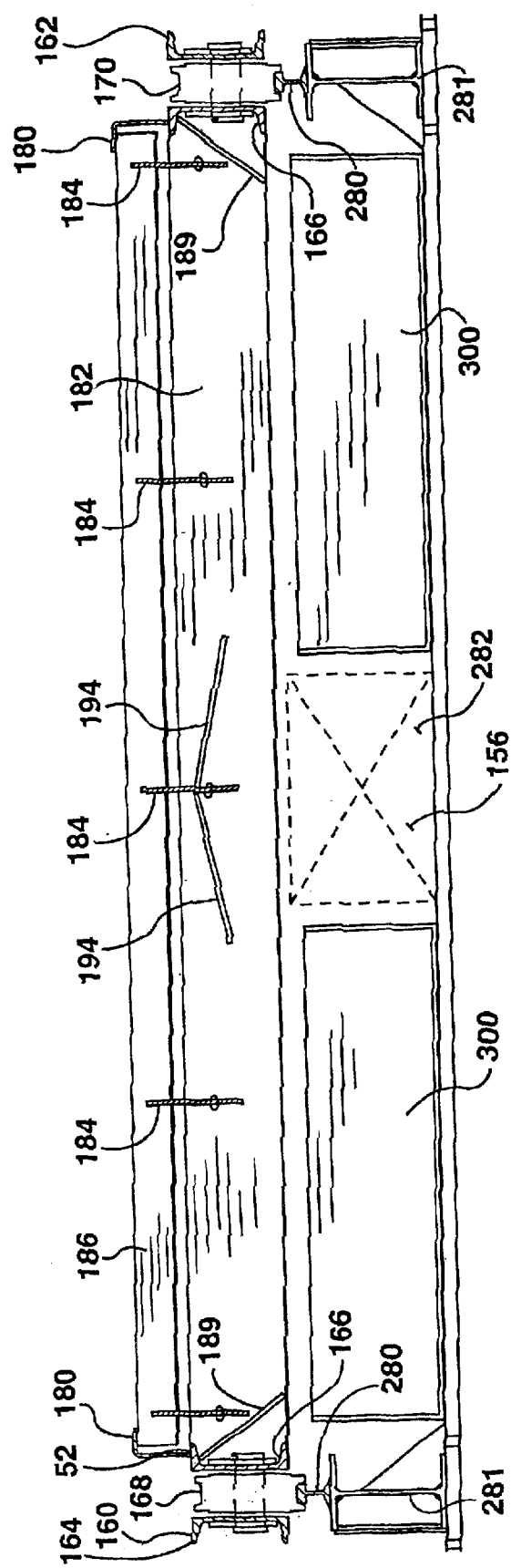
FIG. 5a shows a partial cross-section of a material transporting carriage of the plate cutting facility of FIG. 1.
Figure 5B:
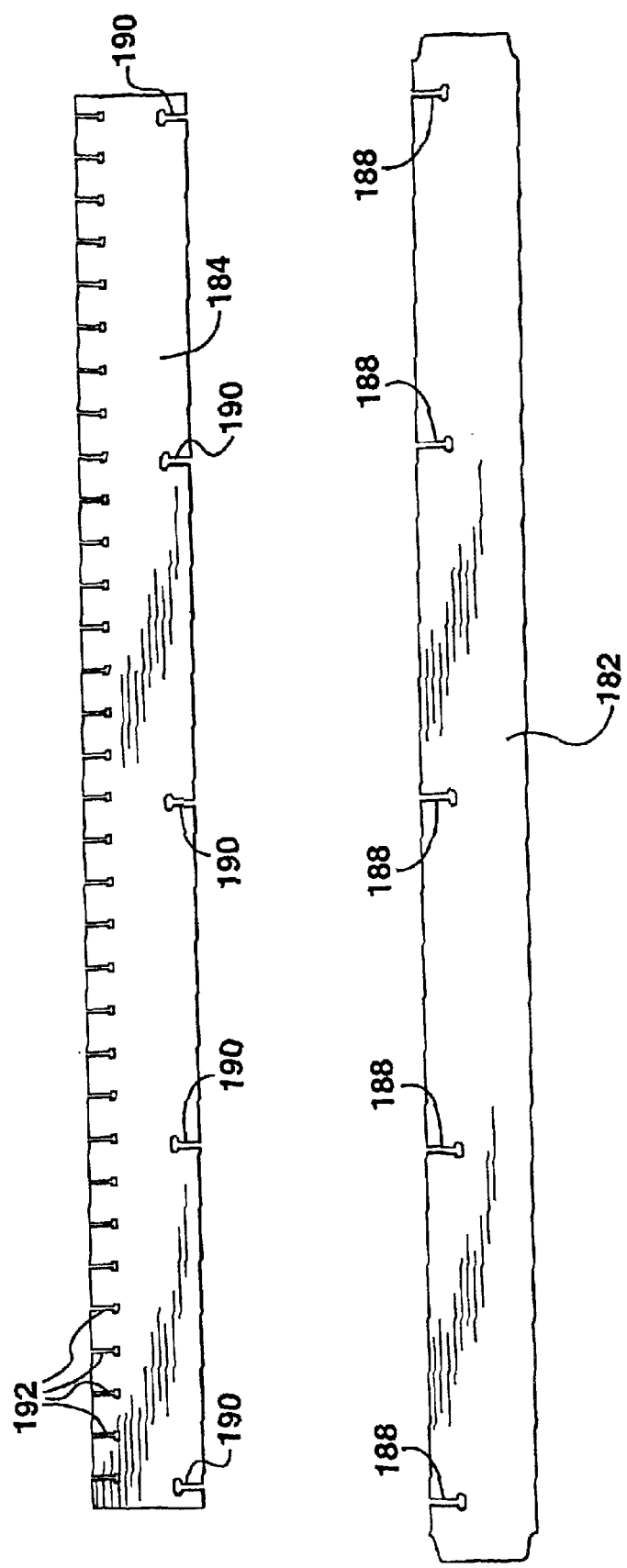

In FIGS. 5a, 5b, each carriage has an array, or matrix, of material support members made up of lower wear bar carriers in the nature of lower stringers 182, upper wear bar carriers in the nature of upper stringers 184, and wear bars 186. Lower stringers 182 are made from plate of a length corresponding to the width between the webs of the inner channel members of side frames 160, 162, and a height corresponding to the depth of the inner channel members. The ends, or tips, of each of lower stringers 182 are cut to a profile matching the internal profile of the inner channel member. Lower stringers 182 are made of steel and are welded in position in spaced vertical planes along side frames 160, 162.

Upper stringers 184 and lower stringers 182 have corresponding knife joints 188, 190, that is, slots, located such that at each crossing of a lower stringer by an upper stringer, a downwardly opening slot of a lower stringer aligns with an upwardly opening slot of an upper stringer to permit the upper and lower stringers to slide together vertically, forming a cross-hatched matrix. Upper stringers 184 are not welded in place and can be lifted out for replacement as required. Given the pitch of lower stringers 182, the length of upper stringers 184 is such that each upper stringer spans four gaps, or pitches, between lower stringers 182, with the ends notched to overhang. The next adjacent upper stringer is also notched such that the two longitudinally adjacent upper stringers overlap the last joint. The upper stringers are also made from mild steel, and are electrically conductive. The upper edge of each upper stringer 184 is also notched with slots or knife joints 192 for receiving the horizontally extending wear bars 186.

Wear bars 186 are made of flat bar of a length spanning the carriage between cap angles 178, 180, and of a thickness corresponding to the thickness of the slots, knife joints 192 in the upper edges of upper stringers 184. Wear bars 186 are made of mild steel, are electrically conductive, and are not provided with notches. Cap angles 178, 180 serve to prevent wear bars 186, upper stringers 184 and lower stringers 182 from being lifted out when electromagnets are used to remove work pieces or scrap from the carriage. Inclined baffles 194 are mounted longitudinally between lower stringers 182 to encourage slag to fall into slag pans 300, and function to discourage slag from clogging the dampers 286 of the exhaust system.

Wear bars 186, upper stingers 184 and lower stringers 182 are all electrically conductive, and provide multiple paths by which the plasma arc current can reach ground through the side frames and end frames into the grounded platens of stop 80 (or 81) and clamp clamping member 82 (or 83).

Each of wear bars 186 is a steel bar made from a 11'–4" long, 4"×¼" flat bar (+/−) set on edge, each flat bar having a length of about 11'–8" to span the corresponding distance between the webs of the inner channels of end frames 82 and 84. There are 99 wear bars 186 spaced along the length of each carriage, that length being about 64'–10". This array of parallel bars provides a matrix upon which work-pieces to be cut can be supported. Wear bars 186 are consumable items. That is, when plasma arc cutting occurs, the arc may tend to cut to a depth exceeding the thickness of the materials to be cut, and may notch the upper edge of the wear bars at the locations at which the desired profile of the cut crosses each wear bar. The wear bars also tend to become encrusted with slag. When the wear bars have been used several times they can be changed out for new, unworn bars. When the upper edges of the backing bars have been cut many times in this way, such that they may no long provide enough points of support to reliably support the work pieces in the desired horizontal plane, they are replaced.

As noted to above, the carriages are constrained to follow the fore-and-aft rails. To this end, each end frame of each carriage has a drive force interface member in the nature of a towing lug 198 for engagement by a drive hook, as described below.

Description of Shuttles

Figure 6A:
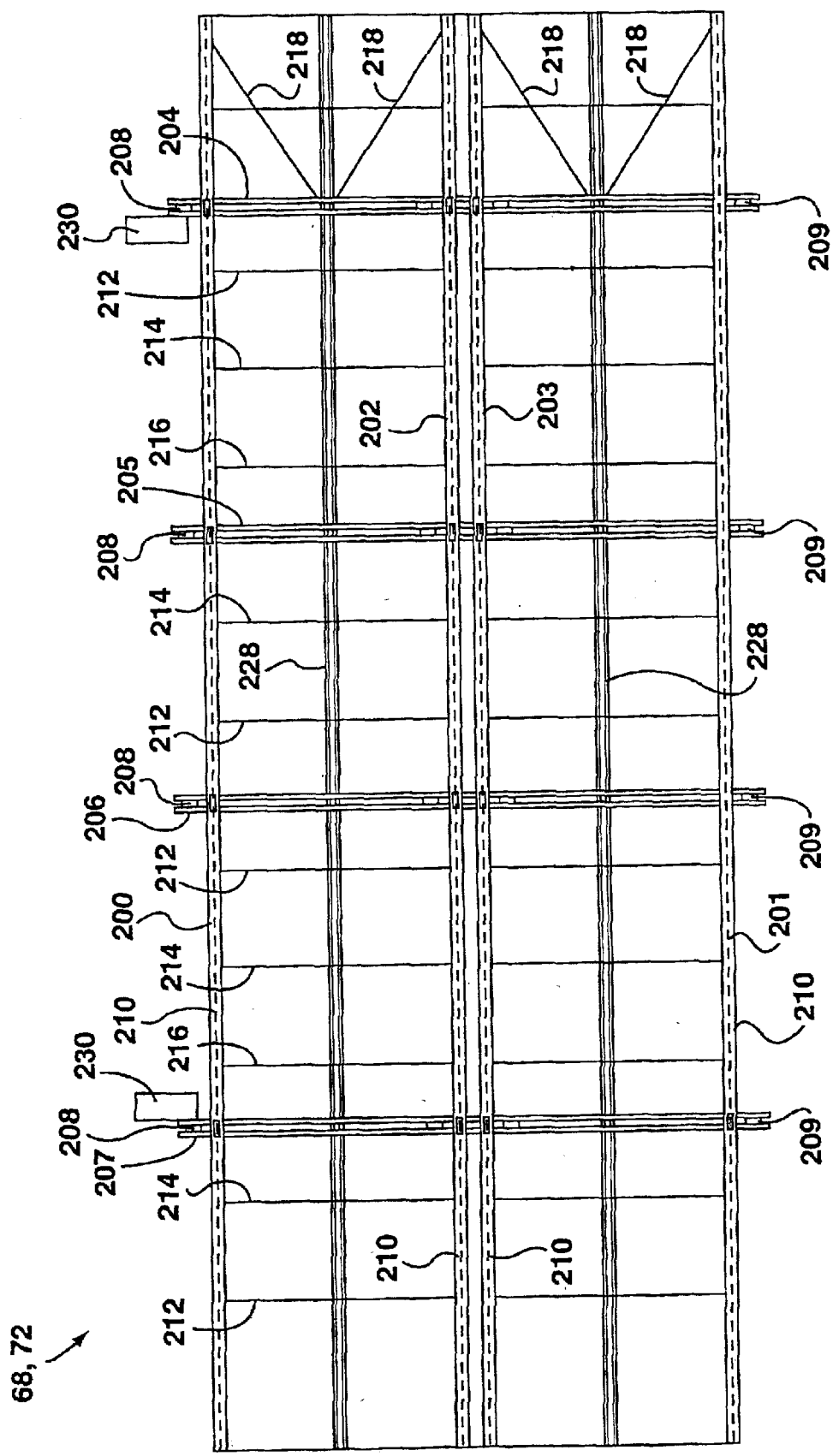
FIG. 6a shows a chassis layout schematic for secondary carriages of the plate cutting facility of FIG. 1.
Figure 6B:
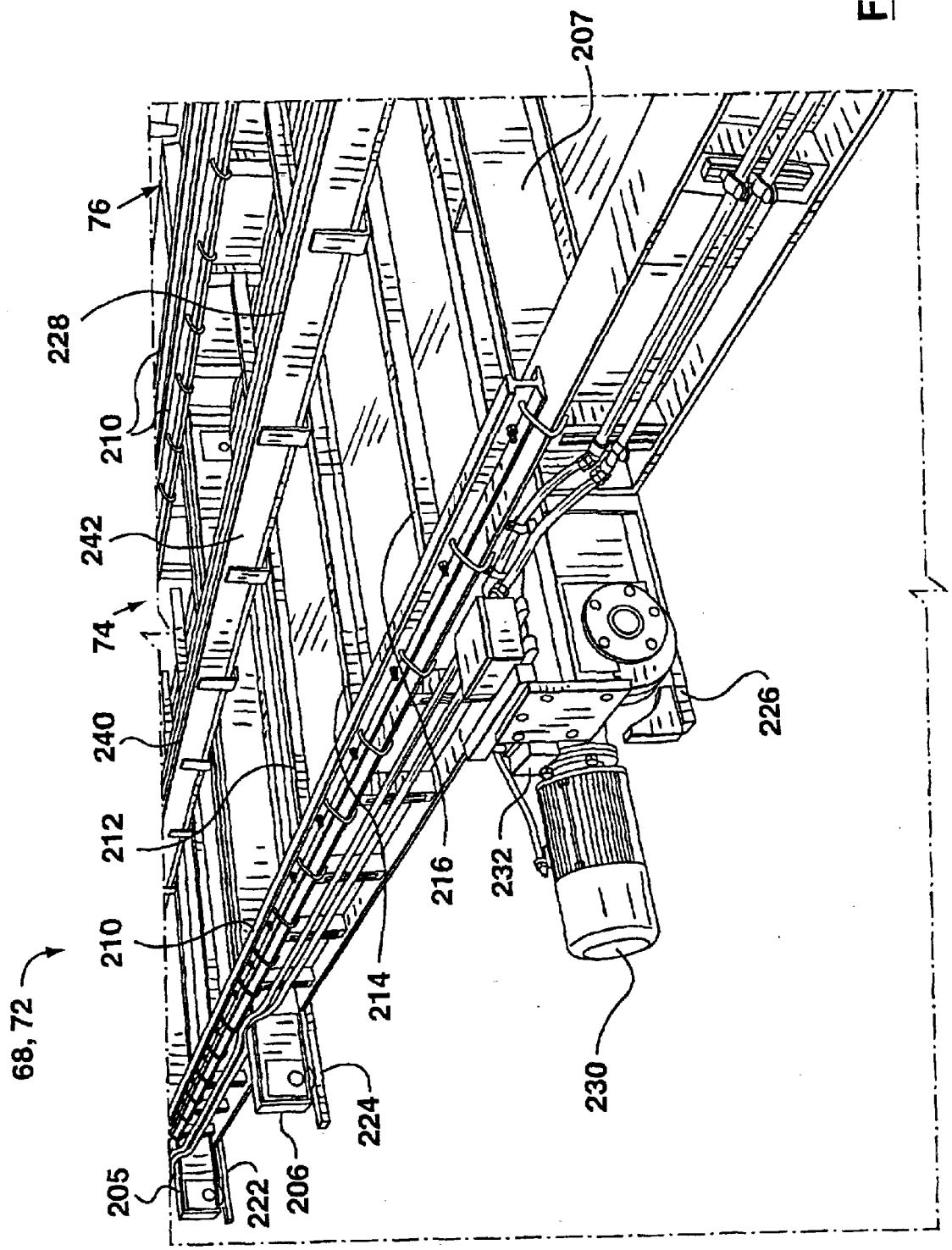

Shuttles 68 and 72 also have the same construction. Referring particularly to FIGS. 6a and 6b, each has a rectangular steel ladder frame having side frames in the nature of wide flanged beams 200, 201, intermediate longitudinal beams 202, 203 and lateral beams 204, 205, 206 and 207 that pass through the webs of side frames 200, 201 and intermediate beams 202, 203. A running rail 210, is mounted to the top flange of each of beams 200, 201 and 202, 203, the pairs 200, 202 and 201, 203 each being spaced a suitable distance to correspond to the spacing of the pairs of rails of portion 50 or portion 64. Intermediate transverse brace members 212 extend between members 200, 201, 202 and 203 between the locations of lateral beams 204, 205, 206 and 207. A longitudinal chain drive is mounted mid-way between beams 200 and 202, 201 and 203. Lateral beams 204, 205, 206 and 207 are each made of a pair of back-to-back channels, spaced apart with gussets. Diagonal braces 218 tend to assist in keeping shuttle 68 (or 72) square.

At the ends of each of lateral beams 204, 205, 206 and 207 are flanged wheels 208, 209 mounted between the channels of beams 204, 205, 206 and 207 to roll along rails 220, 222, 224 and 226 mounted in recessed channels in the floor of bay 26. As noted, rails 220 to 226 extend in the transverse, or y-direction, and permit the shuttle (68 or 72) to move between positions aligned with portions 50 and 64. Electric motors 230 and gear boxes 232 are mounted to one end of each of the foremost and aftmost beams 204 and 207, and operation of these motors and gearboxes will tend to urge the shuttle in either to +y or −y direction as may be appropriate according to the stages of the cycle. Stops are provided at the ends of rails 220 and 226 to prevent overtravel. An operator's platform, or cab, 234 is mounted at the far end of shuttle 68, or 72, from which operation of the shuttles is controlled. Lateral beams 204, 205, 206 and 207 are each made of a pair of back-to-back channel sections, spaced apart with gussets.

Description of Carriage Drives

Figure 7A:
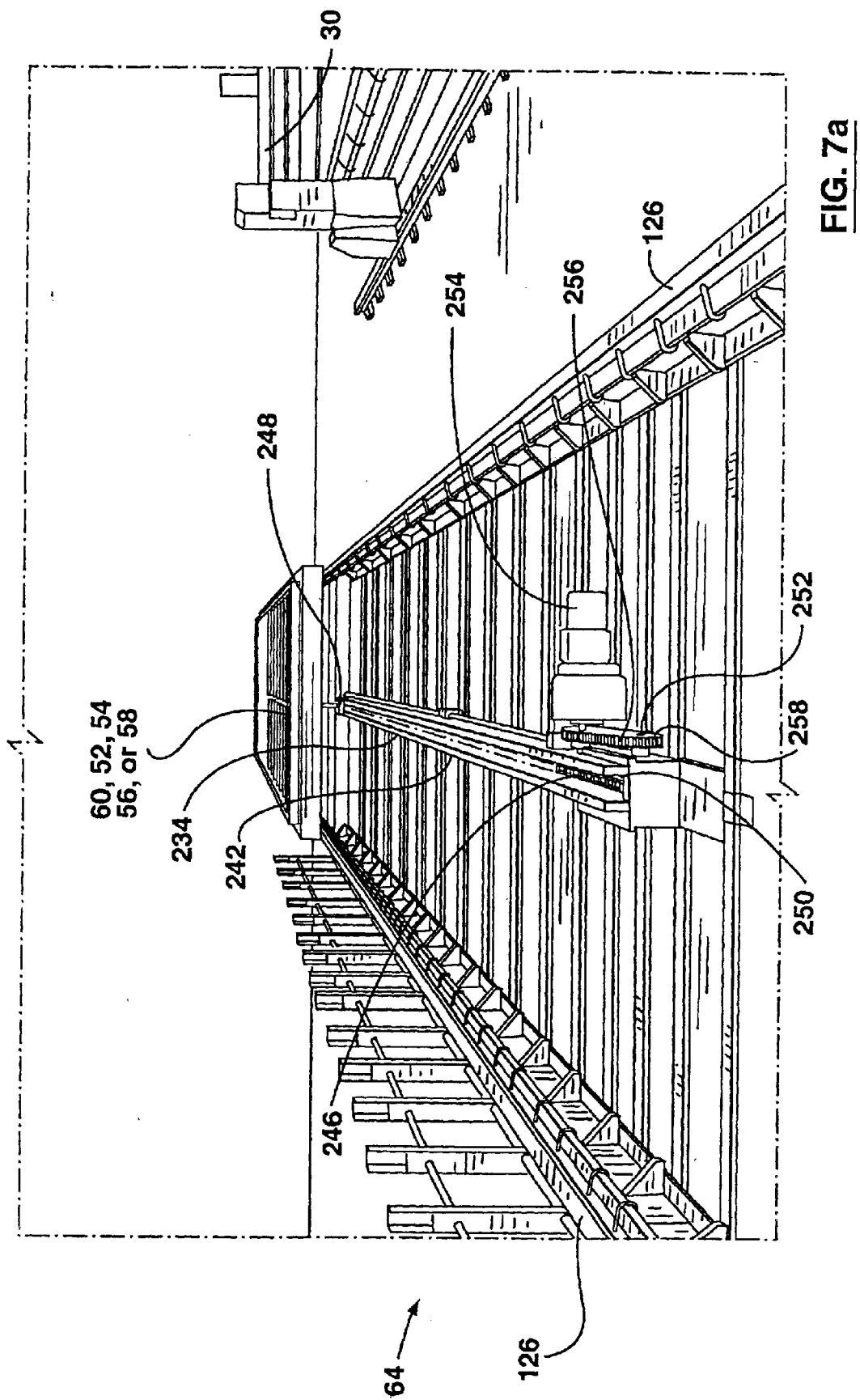
FIG. 7a shows a view looking along the return portion of a transport path of the factory of FIG. 1, indicated as '7a' on FIG. 1.
Figure 7B:
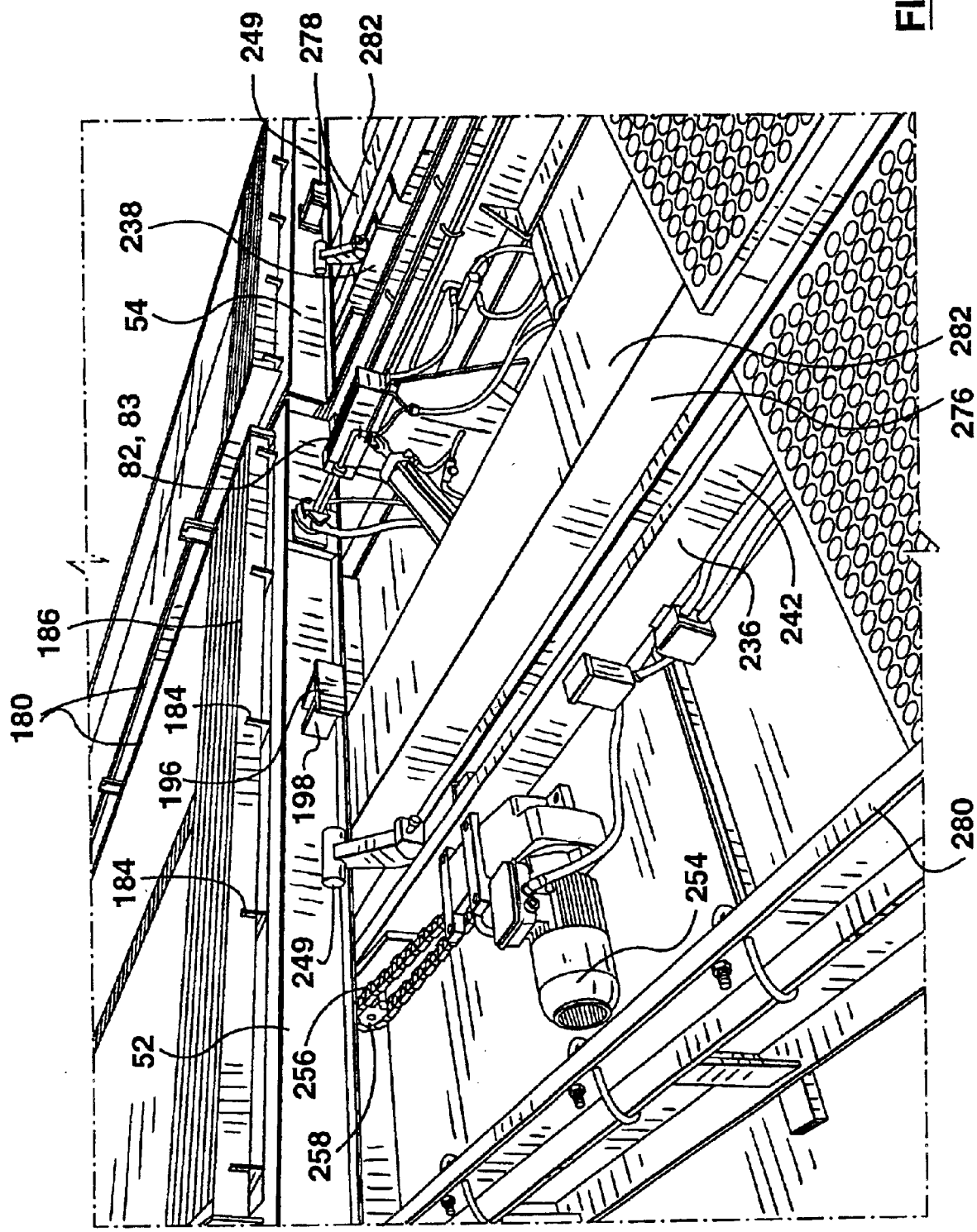
FIG. 7b shows an oblique view of a transition drive train of the factory of FIG. 1 indicated as '7b' on FIG. 1.
Figure 7C:
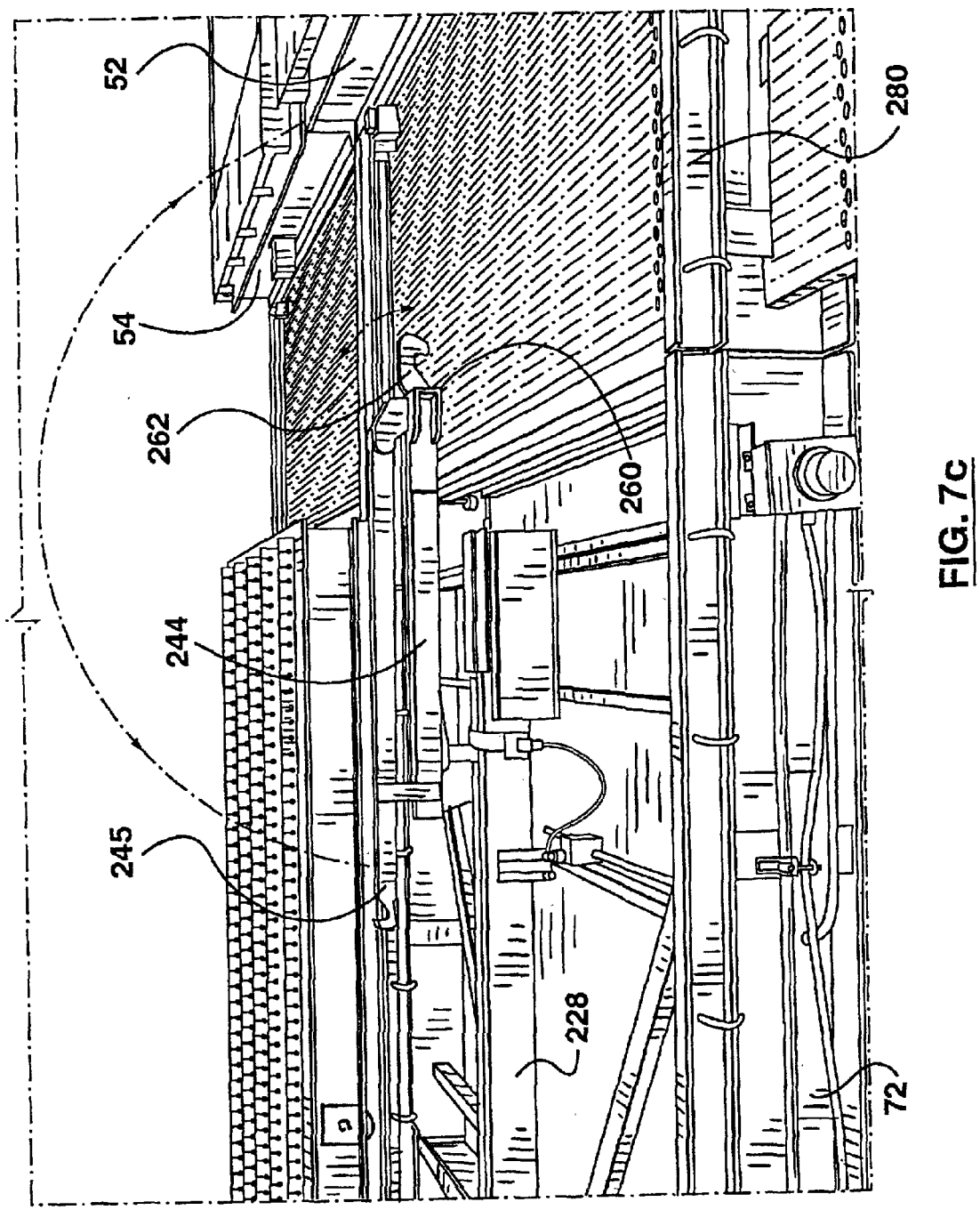

Referring to FIGS. 7a, 7b and 7c, as noted above, each of shuttles 68 and 72 has a pair of motorized chain drives, 228 operable either with a ram head to push against the abutment plate of the towing lug to force the carriage out of the particular berth of the shuttle, or a hook operable to engage the endplate of the towing lug 198 so that each carriage can be drawn into place on the shuttle as required. In addition, return portion 64 has a chain drive 234 that is operable to urge carriages out of the unloading zone toward the re-loading zone, and a pair of short chain drives 236 and 238 are used to push carriages from the end of the push stroke of carriage 68 to the burn position. That is, drives 236 and 238 are used to push carriages, such as carriages 52 and 54, over the threshold of the doorway of bay 26, and the last few feet past the doorway into the burn position. These chain drives have the same features and differ only in length or in the type of tow head employed. In that light, enumeration of the drive components of one chain drive, 240, are to be taken as being representative of all of the chain drives, except as specifically indicated.

Each chain drive 240 includes a guide rail assembly 242, along which a motion transmission member, such as towing head 244 of shuttle 72, runs. Towing head 244, (or such other towing head or pusher may be used), is attached to both ends of a chain 246, that is carried over an idler 248 at one end of guide rail assembly 242, and a driven pinion 250 at the other. Driven pinion 250 is itself mounted on a stub shaft 252 that is driven by an electric motor 254 through a transmission chain 256 and an input gear 258. All of the elements of chain drive 240 are mounted to the lateral beams 204 to 207 and the transverse braces 212, 214 and 216 of the chassis of shuttle 68 (or 72, as may be).

Towing head 244 is of the type used on shuttle 72. Towing head 244 includes a pushing member in the mature of a prong 260 whose distal end can be positioned to bear against the end plate 196 of towing lug 198 of each of the carriages, as when it is desired to move one of the carriages from shuttle 72 to rails 126 of portion 64. Towing head 244 also has a long hook 245 that is swung into place across the walkway to catch on the chamfered upward lip of end plate 196 of towing lug 198. When attached in this way, operation of the chain drive of shuttle 72 in the +x direction will cause towing head 244 for draw a carriage onto shuttle 72.

The towing head of the chain drive of shuttle 68, does not have the long hook, but rather employs short retractable hook 262. When either of the chain drives of shuttle 68 is driven in one direction, it will tend to force prong 260 to move in the positive x direction, thus urging any carriage carried on shuttle 68 in the +x direction into the burn position. When towing head 244 is in the pushing mode, hook 262 is in the retracted position. However, when it is desired to draw a carriage from the unloading position on rails 126 of portion 64 onto carriage 168, as for removal of scrap and re-loading, hook 262 is moved, i.e., pivotted, to a deployed position to engage the eyelet of towing lug 198, by which the particular carriage can be towed. Prong 260 has a sufficient reach to push the carriage to the point at which it can be moved with one or other of chain drives 236 or 238 past the door threshold, and into the burn position.

Chain drives 234, 236 and 238 employ pushers 249 in place of towing head 244. Pusher 249 is biased by a spring to a raised position. In the raised position the head of pusher 249 bears against the end frame of the carriage, whichever it may be, and, when driven, urges the carriage along whichever set of rails it is running on. However, when it is desried to return pusher 249 to its start position, or when it is desired to allow a carriage to pass over pusher 249, the spring allows pusher 249 to deflect pivotally, such that the head of pusher 249 moves downward, and forward in the direction of advance of the particular chain drive. Once the object has passed overhead, pusher 249 resumes its raised position. In summary, the operation of chain drives 228 mounted to shuttles 68 or 72, or chain drives 234, 236 or 238, in the x direction, and the movement of shuttles 68 and 72 in the y direction permits the various carriages to be urged around the circuit of path 48 between loading (or re-loading), cutting, and unloading positions.

When a carriage is being loaded into the burn position, clamping member 82 (or 83) lies in a retracted, or 'down' position shy of the profile of rails 280 of portion 50, such that it is clear of whichever of the carriages may next pass overhead. When the carriage is in position against stop 80 (or 81) as the case may be, clamping member 82 (or 83) is pivotted about a longitudinal axis to an upright position. Once in the upright position, the electrically conductive platen of clamping member 82 (or 83) is tightened against the end frame of the carriage, as described above, and cutting can commence. When cutting is complete, clamping member 82 (or 83) is released, and pivoted back to a the lowered position to clear the pathway for the next carriage.

Description of Venting System

When the plasma arc cutting heads are in operation, a quantity of noxious gases and fumes is produced. The raising of the work piece plates clear of the floor on top of the carriages, which are carried on rails 280, mounted on support beams 281, permits the installation of a ventilating, or gas extraction apparatus in the nature of a vacuum system 156 whose intakes draw from the region below the plates under the location of the cutting heads. The gases and suspended particles so removed may then be filtered and treated as may be required at an external settling device, such as a cyclone or scrubber.

In Winter operation, the vertically moving end doors 277 of the bay are raised only far enough to admit entry or exit of the carriages, each of the end doors being provided with movable skirt sheets 279, of either rubber or plastic, that hang across the opening, and are deflected by the movement of the carriages. The skirt sheets fall back into place when the carriages are clear. Fresh air is supplied to the bay by the ventilating fans of the building generally (not shown).

Figure 8A:
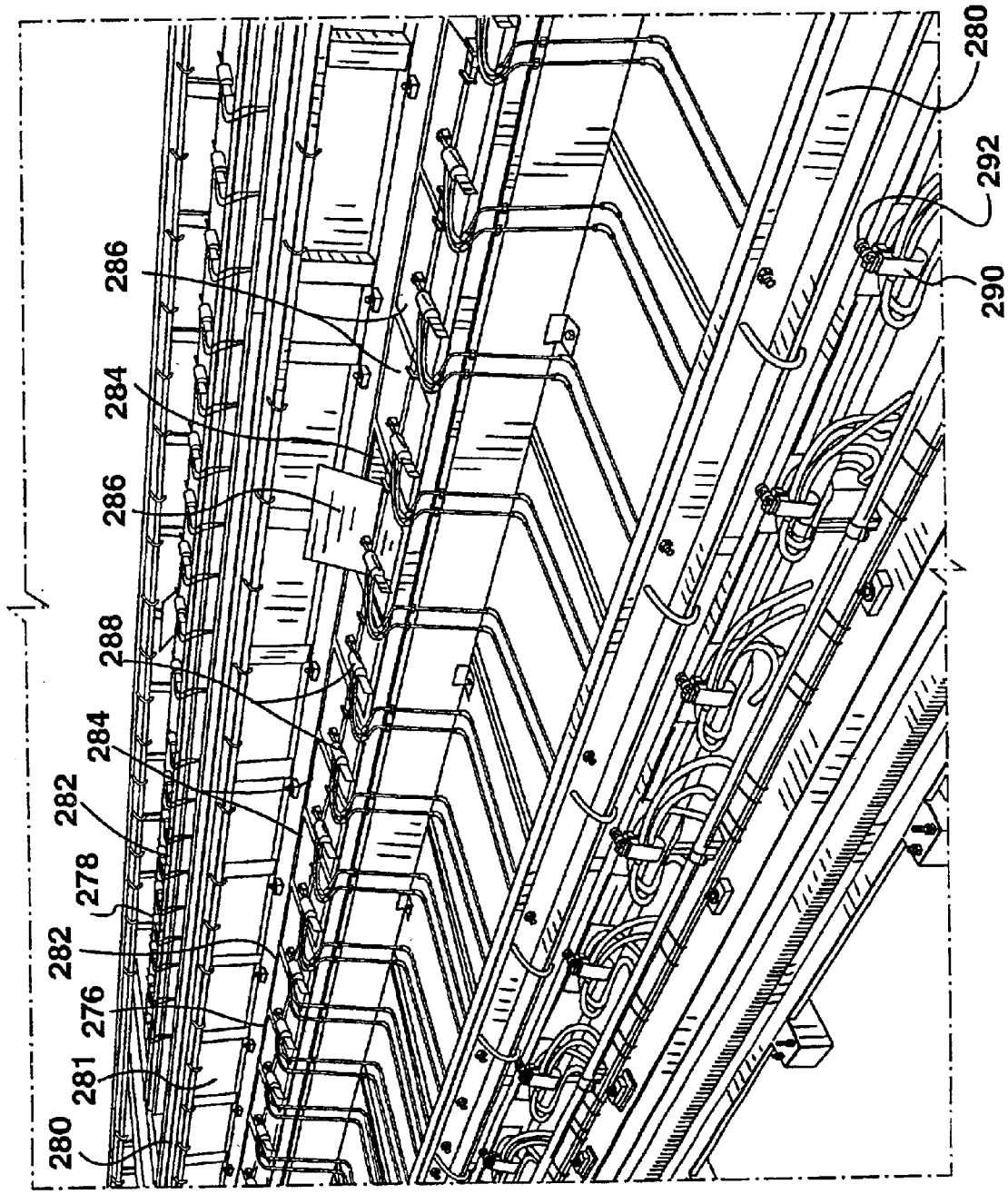
FIG. 8a shows a view of an exhaust manifold for the cutting facility of FIG. 1 with one exhaust manifold port open.
Figure 8B:
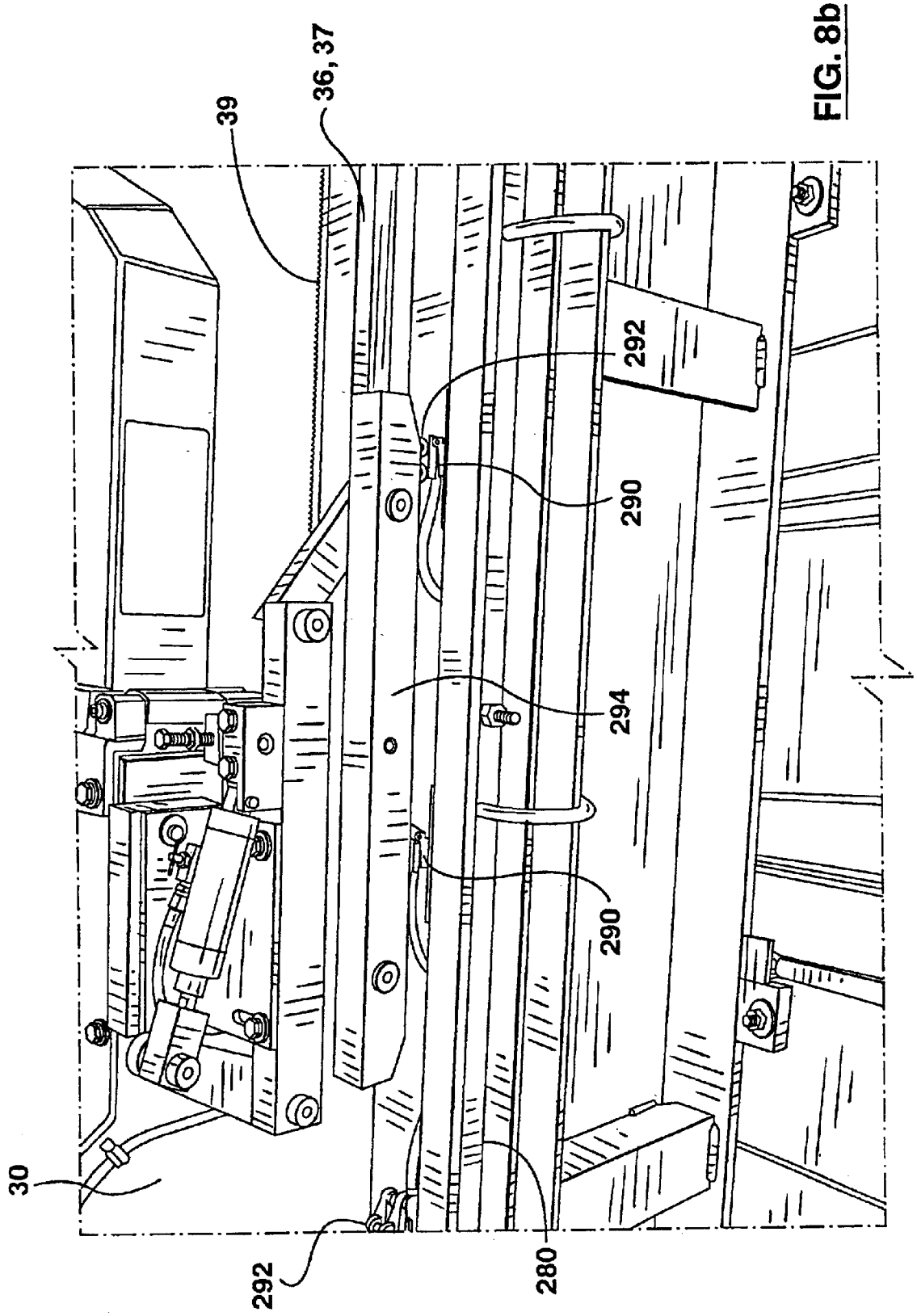

Referring to FIGS. 1, 8a and 8b, the venting system includes an external dust cyclone assembly, indicated as 270, mounted outside of doors 272, out of the way of movement of shuttle 68. Dust cyclone assembly 270 can include particle filtering elements, a liquid scrubbing element, whether of the water curtain of water bath type, or an electrostatic type of scrubber, as may be found suitable for the operating conditions of the plant more generally. In any case dust cyclone assembly 270 includes a cyclone for settling out solid particles, and a blower operable to draw air, noxious gases, and fumes through the venting system generally. In the preferred embodiment the venting system includes three cyclones and three blowers operating in parallel, although a greater or lesser number can be used depending on system design point—that is, at the combination of a desired volumetric flow rate, and the corresponding pressure drop through the system at the desired flowrate.

Dust cyclone assembly 270 is fed by through a common feed duct 274 drawing from a pair of first and second inflow manifolds 276 and 278. Feed duct 274 is routed to pass below rails 280 of portion 50. Rails 280 of portion 50 are raised on longitudinal beams to match the height of the rails of shuttles 68 and 72. This height also gives a clearance space in which to run ducting or to place boxes for the collection of slag. Inflow manifolds 276 and 278 each have the form of a rectangular duct, or trunk 282, extending in the x-direction midway between each of the respective pairs of rails of the first and second berths, or slots, of the cutting position 'B'. That is, when carriages, such as carriages 52 and 54 are in the burn position, and cutting is underway, inflow manifolds 278 lies under carriage 52, and inflow manifold 524 lies beneath carriage 54.

In each case trunk 282 has a series of ports 284 formed in its upper wall, each of the ports having a closure member or door, or damper, 286 movable between an open position in which gases can flow into trunk 282, and a closed position in which flow is impeded. Each of dampers 286 is controlled by a pneumatic actuator 288. Each of actuators 288 is operable in response to a pneumatic signal carried from a pneumatic switch valve 290 mounted adjacent to the running rails of burn carriage, namely bridge 30. Each pneumatic switch valve is actuated by pressing downwardly on an upwardly biased valve actuator, in the nature of a spring loaded cam follower. The cam follower in this instance is a roller 292. The pneumatic switch valves of manifold 278 are aligned in a first row extending in the longitudinal, x, direction, and the pneumatic switch valves of inflow manifold 276 are aligned in a second longitudinal row, offset from the row of the switch valves of inflow manifold 278.

The burn carriage 30 has a shoe 294 mounted at one end thereof. Shoe 294 is operable to control the position of valves 290 as burn carriage 30 travels in the x direction. Shoe 294 has two downwardly facing cams, one for the switching valves of inflow manifold 278, and the other for the inflow valves of manifold 278. Shoe 294 can be raised pneumatically to run completely clear of switch valves 290, such as where burn carriage 30 is running to a disengaged position without any of the plasma arc cutting heads in operation. The cams of shoe 294 can also be lowered so that it operates each one of switching valves 290 as they are encountered in turn. In a further alternative, where cutting is occurring on only one carriage, shoe 294 can be positioned to engage the switching valves 290 of only one of inflow manifold 278 or inflow manifold 278, so that cases are drawn only from under the carriage subject to cutting.

As the burn carriage moves, the cams engage the cam followers, causing the dampers of the ports most closely adjacent to the cutting operation to open, and to remain open while cutting is in that vicinity. When the cutting heads move away, those dampers close, and the next adjacent dampers open. In this way, the opening in the manifold moves, in effect, to follow the cutting heads as the burn carriage moves longitudinally. At any time at least one damper 286 is open, and in transition, two dampers are relatively briefly open together. As a result, venting system provides a sink, or low pressure area, adjacent to the cutting heads toward which gases and fumes tend to be drawn. Inasmuch as the matrix of lower strings 182, upper stringers 184 and wear bars 186 provides a plurality of vertical pathways for gas to be drawn downwardly, and given that the work-piece material tends to form a barrier to passage of the air downwards, the area under the matrix of stringers will itself tend to act as a plenum, the gas and fumes most close to the open port of the inflow manifold will tend to be most strongly urged toward the manifold, when they can be exhausted from the bay.

To either side of either inflow manifold 276 or 278, between the vertical side walls of trunk 282, and the adjacent rails 280 there is a space into which, in the general course of cutting, undesirable materials may tend to collect, such a blanks cut from the work pieces, slag, soot, and so on. To facilitate removal of this unwanted material, slag boxes, or slag pans 300 are placed in close fitting positions between trunk 282 and each of the rails to either side. Each slag box has four upright sides assembled to form the peripheral walls of a rectangular box, and a base, forming the bottom of the box. Each box also has a pair of lateral internal partitions, typically dividing the box in three roughly equal portions. The partitions are provided with lifting holes, such that when the boxes approach full, they can be lifted out by crane and replaced.

Various embodiments of the invention have now been described in detail. Since changes in and or additions to the above-described embodiments may be made without departing from the nature, spirit or scope of the invention, the invention is not to be limited to those specific embodiments.

We claim:

1. An apparatus for the cutting of sheets of metal material, said apparatus comprising:
   a first transfer carriage for supporting material to be cut;
   a cutting head; and
   a pathway along which to move the transfer carriage;
   said cutting head and said transfer carriage being movable relative to each other to permit said cutting head to cut profiles of objects lying in a plane;
   said carriage being movable between a loading position clear of said cutting head, and a cutting position in which said carriage presents the material to be cut to said cutting head; and
   said path including a portion along which said carriage can by-pass said cutting head.

2. The apparatus of claim 1 wherein relative motion of said transfer carriage and said cutting head is automatically controlled.

3. The apparatus of claim 1 wherein said cutting head includes a cutting member chosen from the set of cutting members consisting of (a) a cutting torch; and (b) a plasma arc.

4. The apparatus of claim 3, and further comprising a venting system operable to convey fumes from operation of said cutting member away from said apparatus.

5. The apparatus of claim 4 wherein said venting system is a vacuum system operable to draw fumes from below said cutting head.

6. The apparatus of claim 1 wherein at least said cutting head and a portion of said path adjacent to said cutting head are mounted within a sheltering structure.

7. The apparatus of claim 1 wherein at least a portion of said path is over-spanned by a movable crane, said crane being operable to engage pieces of the sheet material.

8. The apparatus of claim 1 wherein said path has the form of a continuous circuit.

9. The apparatus of claim 8 wherein said path includes alternate branches by which mote than one carriage can be conducted to a position for interaction with said cutting head.

10. The apparatus of claim 8 wherein said apparatus has more than one cutting head operable to cut profiles in material transported by said carriage.

11. The apparatus of claim 8 wherein said path includes alternate branches, said apparatus includes more than one carriage and more than one cutting head, and said carriages can be directed to said alternate branches for engagement by more than one cutting head at a time.

12. The apparatus of claim 8 wherein:

said apparatus includes at least a second transfer carriage; and said first transfer carriage is movable to said loading position while said second transfer carriage is in said cutting position.

13. The apparatus of claim 8, wherein:

said apparatus includes at least a second transfer carriage; and said path includes an unloading position clear of said cutting position.

14. The apparatus of claim 13 wherein said first transfer carriage is movable to said unloading position while said second transfer carriage is in said cutting position.

15. The apparatus of claim 14 wherein said unloading position is mounted within a sheltering structure.

16. The apparatus of claim 13 wherein said first transfer carriage is movable between said unloading and loading positions while said second transfer carriage is in said cutting position.

17. The apparatus of claim 1 wherein said apparatus includes a first drive operable to move said carriage along a first axis relative to said cutting head in said cutting position.

18. The apparatus of claim 17 wherein said apparatus includes a second drive operable to return said carriage to said loading position.

19. A plasma arc cutting apparatus including:

a plasma arc cutting head;

a movable bed for supporting a planar workpiece;

a path defining a circuit about which said movable bed can move;

said movable bed being movable to a cutting position in which said cutting head is operable to cut the workpiece;

said movable bed being movable to another position in which said bed is distant from said cutting head:

said head being mounted to move in two directions relative to the movable bed to permit said cutting head to cut profiles in a planar workpiece carried on said bed when said bed is in said cutting position; and the movable bed being operable to transport the workpiece away from the cutting head to the other position when cutting of the workpiece has ceased.

20. The apparatus of claim 19 wherein said apparatus includes a plurality of movable beds, a first of said movable beds being movable to occupy said cutting position after a second of said movable beds has been moved away from said cutting position.

21. The apparatus of claim 20 wherein said movable beds are constrained to move along said circuit between said cutting position and a loading position.

* * * * *